Jan. 9, 1968  S. W. BRIGGS ET AL  3,362,541

FILTER

Filed June 2, 1964

INVENTORS
SOUTHWICK W. BRIGGS &
WILLIAM A. BRAZEROL

BY Raymond W. Cotton

ATTORNEY

United States Patent Office 3,362,541
Patented Jan. 9, 1968

3,362,541
FILTER
Southwick W. Briggs, Chevy Chase, Md., and William A. Brazerol, Washington, D.C. (both % Stone Filter Co., Inc., 900 Franklin St. NE., Washington, D.C. 20017)
Filed June 2, 1964, Ser. No. 372,005
5 Claims. (Cl. 210—457)

This invention relates to a pleated paper filter and is concerned with the maintenance of the outer folds of a pleated paper filter medium in spaced relationship in order to insure the exposure of a large area of the medium for effective filtering.

In conjunction with known constructions of pleated paper filters, there has been a tendency for the folds of the pleats exposed to upstream pressures to collapse on one another, reducing the effective filtering area and thereby reducing the useful life and effectiveness of such filters. In an effort to overcome this tendency, it has been proposed in the past to provide an adhesive bond between the outer pleats of such a filter medium and a cover member. The cost of the adhesive and applying it represents a substantial item in the total cost of such filters and moreover, wherever the adhesive covers the surface of the filter medium, that portion of the surface loses its porosity so as to reduce the effective filter area.

In an effort to overcome these problems, the present invention includes among its objects to provide a filter comprising a perforated center tube, a permeable paper filter medium having axial pleats defining inner and outer folds, the inner folds engaging the center tube, a perforated cover member surrounding the medium, and spaced projections bonded to the cover member engaging the outer folds and maintaining them in spaced relationship. Such projections are preferably formed of corrugated paper, and in a preferred embodiment of the invention, such projections are formed by a plurality of such spaced corrugated paper bodies in the form of spaced strips. It is contemplated that the projections be formed of permeable material so that they might also serve a filtering function. In a preferred form of the invention, the cover member is formed from paper and the projections are bonded thereto by an adhesive material.

A more complete understanding of the invention will follow from a description of the accompanying drawings wherein.

Figure 1:
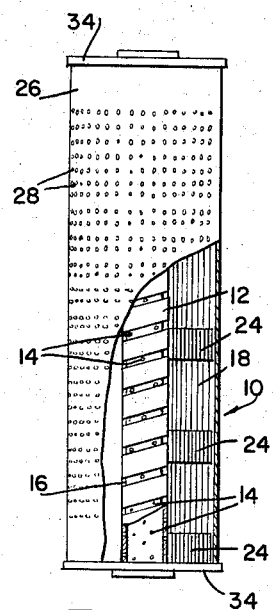
FIG. 1 is an elevation, partially broken away, depicting a filter embodying the present invention.

The filter 10 depicted in FIG. 1 includes a center tube 12 containing perforations 14 and grooves 16 surrounded by a pleated paper medium 18 having pleats 20 defining outer folds 22 and inner folds 42 engaging the outer periphery of the center tube 12. The outer folds 22 of the pleated paper medium 18 are maintained in spaced relationship with respect to one another by means of one or more corrugated elements 24 which will be adhesively bonded to a cover member 26 containing perforations 28. The peaks 30 of the corrugated element or elements 24 proximate the cover member 26 are bonded thereto by means of a suitable adhesive material 31. The selection of the adhesive material as well as the selection of the other materials will be consistent in all cases with the requirements of the materials undergoing filtration. In the case of hot lubricating oils of the types used in conjunction with locomotive diesel engines, thermosetting adhesives such as phenolformaldehyde resins will be suitable for this purpose.

Figure 2:
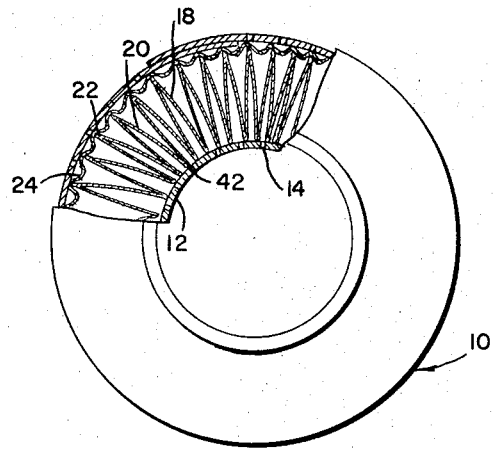
FIG. 2 is a plan view, partially broken away and partially in section of the filter depicted in FIG. 1, on an enlarged scale.
Figure 3:
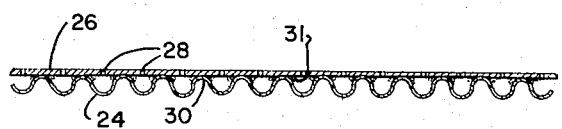
FIG. 3 is a sectional elevation of a cover member having projections bonded thereto.

As shown in FIGURE 2 and FIGURE 3, the peaks of the corrugated strips, positioned between the outer folds 22, are rounded to aid in assembly of the filter and to reduce contact between the pleats of the filter medium and the corrugated element.

Figure 4:
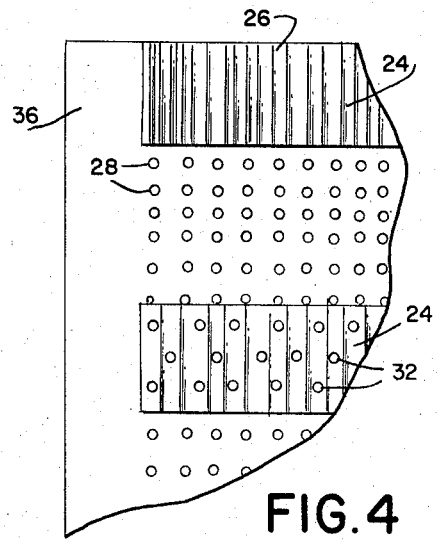
FIG. 4 is a fragmentary plan view of one form of cover member having projections bonded thereto.
Figure 5:
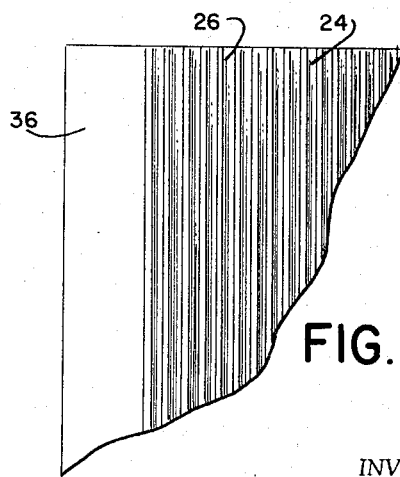
FIG. 5 is a plan view of another form of cover member according to the present invention having projections bonded thereto.

Spaced corrugated strips 24 have been depicted in FIG. 4 as well as in FIG. 1 whereas FIG. 5 depicts a corrugated element 24 shown as coextensive with the cover member 26. In the case of the lower corrugated strip 24 of FIG. 4, it has been depicted as containing openings 32 in order to facilitate the flow of materials undergoing filtration.

The filter depicted in FIG. 1 has been shown as provided with conventional end caps 34 to establish the flow path and maintain the parts in assembled relationship.

An edge 36 of each of the cover members 26 remains completely exposed to facilitate the formation of a longitudinal seam after the cover member has been wrapped about the pleated paper medium. This seam can be produced by the use of a suitable adhesive and by terminating the pleated paper elements short of the edges of the cover member, undue thickness of the joints formed by the longitudinal seams will be avoided.

Many variations of this invention will suggest themselves to those skilled in the art and are contemplated within the scope of the appended claims.

We claim:

1. A filter comprising a perforated center tube, a permeable paper filter medium having axial pleats defining inner and outer folds, said inner folds engaging said center tube, a perforated cover member surrounding said medium, and a band of material providing spaced inwardly directed, rounded projections bonded to said cover member by a thermosetting resin in movable straddling engagement with said outer folds and maintaining them in spaced relationship with each of said outer folds being between an adjacent pair of rounded projections, said band of material containing openings substantially larger than the pores of said filter medium to facilitate flow of materials undergoing filtration.

2. A filter according to claim 1 wherein said projections are formed of corrugated paper.

3. A filter according to claim 1 wherein said projections are formed by a plurality of spaced corrugated strips.

4. A filter according to claim 1 wherein said projections are formed of permeable material.

5. A filter according to claim 1 wherein said cover member is formed from paper.

References Cited

UNITED STATES PATENTS

| | | | |
|---|---|---|---|
| 3,310,177 | 3/1967 | Briggs | 210—457 |
| 2,837,214 | 6/1958 | Kasten | 210—493 X |
| 3,049,240 | 8/1962 | Smith | 210—315 X |
| 3,054,507 | 9/1962 | Humbert et al. | 210—457 X |
| 3,178,025 | 4/1965 | Brucken et al. | 210—315 X |
| 3,189,179 | 6/1965 | McMichael | 210—493 X |

SAMIH N. ZAHARNA, Primary Examiner.

REUBEN FRIEDMAN, Examiner.

C. DITLOW, Assistant Examiner.